2,878,268

6-FLUOROALLOPREGNANE-3,20-DIONES AND 6-FLUOROPREGNANE-3,20-DIONES

J Allan Campbell, Kalamazoo Township, Kalamazoo County, John C. Babcock, Portage Township, Kalamazoo County, and John A. Hogg, Kalamazoo Township, Kalamazoo County, Mich., assignors to The Upjohn Company, Kalamazoo, Mich., a corporation of Michigan No Drawing. Application June 9, 1958
Serial No. 740,552

7 Claims. (Cl. 260—397.3)

The present invention relates to novel 6α-fluoro and 6β-fluoro steroids and is more particularly concerned with novel 6-fluoroallopregnane-3,20-diones and 6-fluoropregnane-3,20-diones.

The novel compounds of this invention can be represented by the formula:

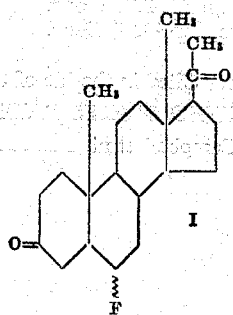

In this application the wavy line ($\xi$) when appearing at the 6-position is a generic expression inclusive of the alpha (α) and beta (β) configuration.

The novel products of this invention, the compounds of Formula I, possess useful pharmacologic properties. The compounds of Formula I possess central-nervous-system regulating properties of improved therapeutic ratio, sedative-hypnotic properties, and anesthetic properties and are accordingly useful adjuncts in the production of anesthesia as well as in aberrant psychological states. Further, they have valuable mineral-regulating and anti-estrogenic properties.

The novel compounds and the process of the present invention are illustratively represented by the following formulae:

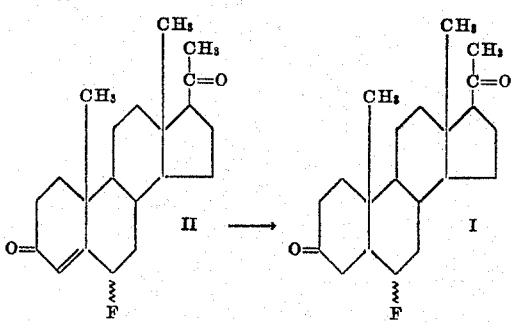

The starting steroids for the process of the present invention, the compounds of Formula II, such as 6α-fluoro-4-pregnene-3,20-dione and 6β-fluoro-4-pregnene-3,20-dione, are prepared in accordance with the procedures disclosed in our copending application Serial No. 699,504, filed November 29, 1957, now Patent No. 2,838,528 issued June 10, 1958.

The process of the present invention comprises hydrogenation of the 4,5-double bond of a 6-fluoro-4-pregnene-3,20-dione. The hydrogenation can be accomplished with hydrogen in the presence of a catalyst, such as a noble metal catalyst, for example, palladium supported on charcoal, zinc oxide, calcium carbonate, and the like, and is usually conducted in a solvent medium. Alkanols, hexane, acetone, methyl ethyl ketone, dioxane, acetic acid, ethyl acetate, or like organic solvents may be advantageously employed, with ethyl alcohol being preferred. The catalyst can be saturated with hydrogen prior to the introduction of the steroid or preferably the steroid, catalyst and supporting media can be contacted together in a solvent medium prior to introduction of the hydrogen. It is not necessary to conduct the reaction under pressure, although, when pressure is utilized, a hydrogen pressure of about one to 100 pounds per square inch gauge or more is operative, a pressure of from about twenty to forty pounds per square inch gauge is preferred. Any suitable temperature between about zero and 100 degrees centigrade may be employed, with room temperature being satisfactory. Hydrogenation is continued until approximately one molar equivalent of hydrogen has been absorbed. The catalyst is then separated from the solution by filtration and the hydrogenated products are isolated by removal of the solvent. Usually the crude hydrogenation product is a mixture containing both the normal and the allo isomers, i. e., 6-fluoropregnane-3,20-dione and 6-fluoroallopregnane-3,20-dione. The isomers are separated by conventional means such as for example, fractional crystallization or chromatography. Alternatively the normal and allo isomers can be conveniently separated by reaction of the mixture with pyrrolidine to form the 3-pyrrolidyl enamine. The 3-pyrrolidyl enamines of the allo and normal isomers possess different solubility properties and may be separated by crystallization from methanol, ether, ethyl acetate, pyridine or the like. After separation, for example, by filtration, the enamine group is removed by treating the crystalline enamine and its mother liquor separately with the base or with water to regenerate the 3-ketone, producing the corresponding 6-fluoropregnane-3,20-dione and 6-fluoroallopregnane-3,20-dione.

This application is a continuation-in-part of application Serial No. 699,504, filed November 29, 1957.

The following examples are illustrative of the process and products of the present invention, but are not to be construed as limiting.

EXAMPLE 1

*6α-fluoroallopregnane-3,20-dione and 6α-fluoropregnane-3,20-dione*

A mixture of 1.0 gram of 6α-fluoro-4-pregnene-3,20-dione, 100 milliliters of 95 percent ethanol, 0.1 gram of five percent palladium on charcoal and one drop of 6 N hydrochloric was shaken under hydrogen pressure. After twelve minutes the pressure became constant. The reaction mixture was filtered and the filtrate obtained was neutralized with one drop of pyridine. The solvent was removed under vacuum to give a residue. The residue was recrystallized three times from acetone-Skellysolve B hexanes to give 120 milligrams of 6α-fluoroallopregnane-3,20-dione having a melting point of 192 to 196 degrees centigrade and an $[\alpha]_D$ plus 118 degrees in chloroform.

*Analysis.*—Calculated for $C_{21}H_{32}FO_2$: C, 75.18; H, 9.62; F, 5.66. Found: C, 75.54; H, 9.08; F, 6.10.

6α-fluoropregnane-3,20-dione is present in the crystallization mother liquors and can be recovered by additional fractional crystallization or chromatography, followed by recrystallization from acetone-Skellysolve B hexanes.

Alternatively, the two isomers can be separated by reaction of the crude residue mixture from the hydrogenation with three milliliters of pyrrolidine in 25 milliliters of methanol at reflux temperature and under an atmosphere of nitrogen for about two minutes. The 3-pyrrolidyl enamines of the allo and normal compounds thus formed are then separated by crystallization. The first crop of crystals of the 3-pyrrolidyl enamine which forms is removed, and is dissolved by adding thereto 200 milliliters of methanol containing ten milliliters of ten percent sodium hydroxide solution and warming under a nitrogen atmosphere at approximately fifty degrees centigrade for about twenty minutes. The mother liquor, containing the remaining 3-pyrrolidyl enamine, which is left following removal of the first crop of crystals, has added thereto 175 milliliters of methanol containing ten milliliters of ten percent sodium hydroxide solution followed by warming at approximately fifty degrees centigrade under a nitrogen atmosphere for about twenty minutes. The solutions are then cooled, neutralized with acetic acid and concentrated to near dryness under reduced pressure. The residues thus obtained are extracted with ether and the ether extract is washed, dried, and evaporated to dryness. Crystallizations from acetone-Skellysolve B hexanes give the pure allo and normal isomers, 6α-fluoroallopregnane-3,20-dione and 6α-fluoropregnane-3,20-dione, respectively.

Following the hydrogenation and separation procedures described above, but substituting 6β-fluoro-4-pregnene-3,20-dione as starting material therein, is productive of 6β-fluoroallopregnane-3,20-dione and 6β-fluoropregnane-3,20-dione.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A 6-fluoro compound of the following formula:

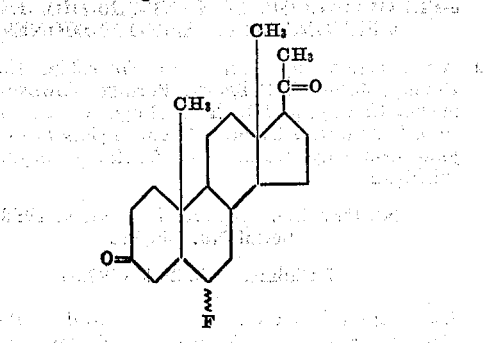

2. 6-fluoroallopregnane-3,20-dione.
3. 6α-fluoroallopregnane-3,20-dione.
4. 6β-fluoroallopregnane-3,20-dione.
5. 6-fluoropregnane-3,20-dione.
6. 6α-fluoropregnane-3,20-dione.
7. 6β-fluoropregnane-3,20-dione.

References Cited in the file of this patent
UNITED STATES PATENTS
2,838,528    Campbell et al. _____ June 10, 1958